United States Patent
Chavanne et al.

(10) Patent No.: US 8,103,004 B2
(45) Date of Patent: Jan. 24, 2012

(54) METHOD, APPARATUS AND SYSTEM FOR USE IN DISTRIBUTED AND PARALLEL DECRYPTION

(75) Inventors: Pierre Chavanne, Davis, CA (US); Oscar Steele, Sunnyvale, CA (US); Yoji Kawamoto, Tokyo (JP); Eric Swenson, Soquel, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1326 days.

(21) Appl. No.: 10/921,498

(22) Filed: Aug. 18, 2004

(65) Prior Publication Data
US 2005/0074125 A1 Apr. 7, 2005

Related U.S. Application Data

(60) Provisional application No. 60/508,771, filed on Oct. 3, 2003.

(51) Int. Cl.
*H04L 9/00* (2006.01)
*H04N 21/2347* (2011.01)
*H04N 21/00* (2011.01)

(52) U.S. Cl. .............. 380/281; 726/27; 726/28; 726/29; 726/30; 380/277

(58) Field of Classification Search .......... 380/277, 380/281; 726/26, 27, 28, 29, 30
See application file for complete search history.

(56) References Cited

U.S. PATENT DOCUMENTS

| | | | |
|---|---|---|---|
| 6,005,938 A * | 12/1999 | Banker et al. ............... 380/239 |
| 6,735,313 B1 * | 5/2004 | Bleichenbacher et al. ... 380/241 |
| 6,859,535 B1 * | 2/2005 | Tatebayashi et al. ......... 380/201 |
| 7,092,527 B2 | 8/2006 | Foster |
| 2002/0013772 A1 * | 1/2002 | Peinado ........................ 705/51 |
| 2002/0059144 A1 * | 5/2002 | Meffert et al. ................. 705/51 |
| 2003/0023862 A1 | 1/2003 | Yamasaki |
| 2003/0028488 A1 | 2/2003 | Mohammed et al. |
| 2003/0037261 A1 * | 2/2003 | Meffert et al. ............... 713/201 |
| 2003/0084306 A1 | 5/2003 | Abburi et al. |
| 2004/0003139 A1 | 1/2004 | Cottrille et al. |
| 2004/0003269 A1 | 1/2004 | Waxman et al. |

(Continued)

OTHER PUBLICATIONS

Jeong et al. DRM Content Adaptation Scheme Between Different DRM Systems for Seamless Content Service. IEEE. 2007. pp. 867-870.*

(Continued)

*Primary Examiner* — Eleni Shiferaw
*Assistant Examiner* — Tamara Teslovich
(74) *Attorney, Agent, or Firm* — Fitch, Even, Tabin & Flannery

(57) ABSTRACT

The present embodiments advantageously provide methods and systems for use in decrypting content, and in some preferred embodiments expanding a security environment to distribute the computational processing involved in decryption. In some embodiments, a method for use in decrypting content is provided that receives a first content key at a first system for the decryption of a first track of encrypted content; encrypts the first content key according to a first instance key known at the first system; communicates the first encrypted content key over an externally accessible communication link to a second system; generates the first instance key at the second system independent of the first system; decrypts the first encrypted content key using the generated first instance key at the second system; and decrypts the first track of encrypted content using the first unencrypted content key at the second system.

17 Claims, 7 Drawing Sheets

U.S. PATENT DOCUMENTS

| | | | |
|---|---|---|---|
| 2004/0003270 A1 | 1/2004 | Bourne et al. | |
| 2004/0044779 A1* | 3/2004 | Lambert | 709/229 |
| 2004/0127196 A1 | 7/2004 | Dabbish et al. | |
| 2004/0148523 A1* | 7/2004 | Lambert | 713/201 |
| 2005/0071278 A1* | 3/2005 | Simelius | 705/52 |
| 2005/0138357 A1 | 6/2005 | Swenson et al. | |

OTHER PUBLICATIONS

Michiels et al. Towards a Software Architecture for DRM. DRM '05. ACM. 2005. pp. 65-74.*

Jamkhedkar and Heileman. DRM as a Layered System. DRM '04. ACM. 2004. pp. 11-21.*

Kim et al. A Trustworthy End-to-end Key Management Scheme for Digital Rights Management. MM '06. ACM. 2006. pp. 635-638.*

Patent Cooperation Treaty, PCT International Search Report and Written Opinion, International Searching Authority, Mailing date: Feb. 5, 2007 8 pages.

* cited by examiner

METHOD, APPARATUS AND SYSTEM FOR USE IN DISTRIBUTED AND PARALLEL DECRYPTION

PRIORITY CLAIM

This application claims the benefit of U.S. Provisional Application No. 60/508,771, filed Oct. 3, 2003, which is incorporated herein by reference in its entirety.

FIELD OF THE APPLICATION

The present application is directed generally toward the distribution of content, and more specifically toward decryption of encrypted content.

BACKGROUND

The communication of data of networks, in some instances, allows unauthorized users to access this information. In many systems, added security is employed to limit unauthorized access. Some of these systems utilize encryption. The encryption and/or decryption of information is often computationally intensive.

Many consumer electronic devices have relatively low processing power for media-rendering. Because of this low processing power, these consumer electronic devices have difficulty in performing cryptographic processing. In many instances it is generally impractical to perform complex cryptographic and media decoding operations in the processors of these devices.

Further, many security schemes, such as many encryption protocols (e.g., digital transmission copy protection (DTCP) protocol), prevent the transfer of content and/or encryption keys to separate processing entities. Therefore, many consumer electronic devices are incapable and/or are severely limited in their abilities to provide users with access to desired content.

SUMMARY

The present invention advantageously addresses the needs above as well as other needs by providing methods and systems for use in decrypting content, and in some preferred embodiments expanding a security environment to distribute the computational processing involved in decryption. In some embodiments, a method for use in decrypting content is provided that receives a first content key at a first system for the decryption of a first track of encrypted content; encrypts the first content key according to a first instance key known at the first system producing a first encrypted content key; communicates the first encrypted content key over an externally accessible communication link to a second system; generates the first instance key at the second system independent of the first system; decrypts the first encrypted content key using the generated first instance key at the second system providing a first unencrypted content key; and decrypts the first track of encrypted content using the first unencrypted content key at the second system.

Some embodiments provide a method for use in decrypting content that receives a first encrypted content key, wherein the first encrypted content key is encrypted by an external system using a first instance key; generates the first instance key independent of the external system; decrypts the first encrypted content key using the first generated instance key; extracts a first content key through the decryption of the first encrypted content key; and decrypts a first track of encrypted content with the first content key.

A system for use in decrypting content is provided in some embodiments. The system includes a main system coupled with a network to receive a first content key; a sub-system; a communication link coupled between the main system and sub-systems; the main system comprising a first instance key and an encryption circuit such that the encryption circuit encrypts the first content key with the first instance key to produce a first encrypted content key, and the main system communicates the first encrypted content key to the sub-system over the communication link; and the sub-system comprises a first slot, a decryption circuit coupled with the first slot, and an instance key generator coupled with the decryption circuit, such that the sub-system stores the first encrypted content key in the first slot, the instance key generator generates a first generated instance key independent of the main system such that the first generated instance key is substantially identical to the first instance key of the main system, and the decryption circuit decrypts the first encrypted content key with the first generated instance key retrieving the unencrypted first content key and decrypts at least a portion of a first track of encrypted content using the unencrypted first content key.

A better understanding of the features and advantages of the present embodiments will be obtained by reference to the following detailed description of the embodiments and accompanying drawings which set forth illustrative examples in which the principles of the embodiments are utilized.

BRIEF DESCRIPTION OF THE DRAWINGS

The above and other aspects, features and advantages of the present embodiments will be more apparent from the following more particular description thereof, presented in conjunction with the following drawings wherein.

Figure 1:
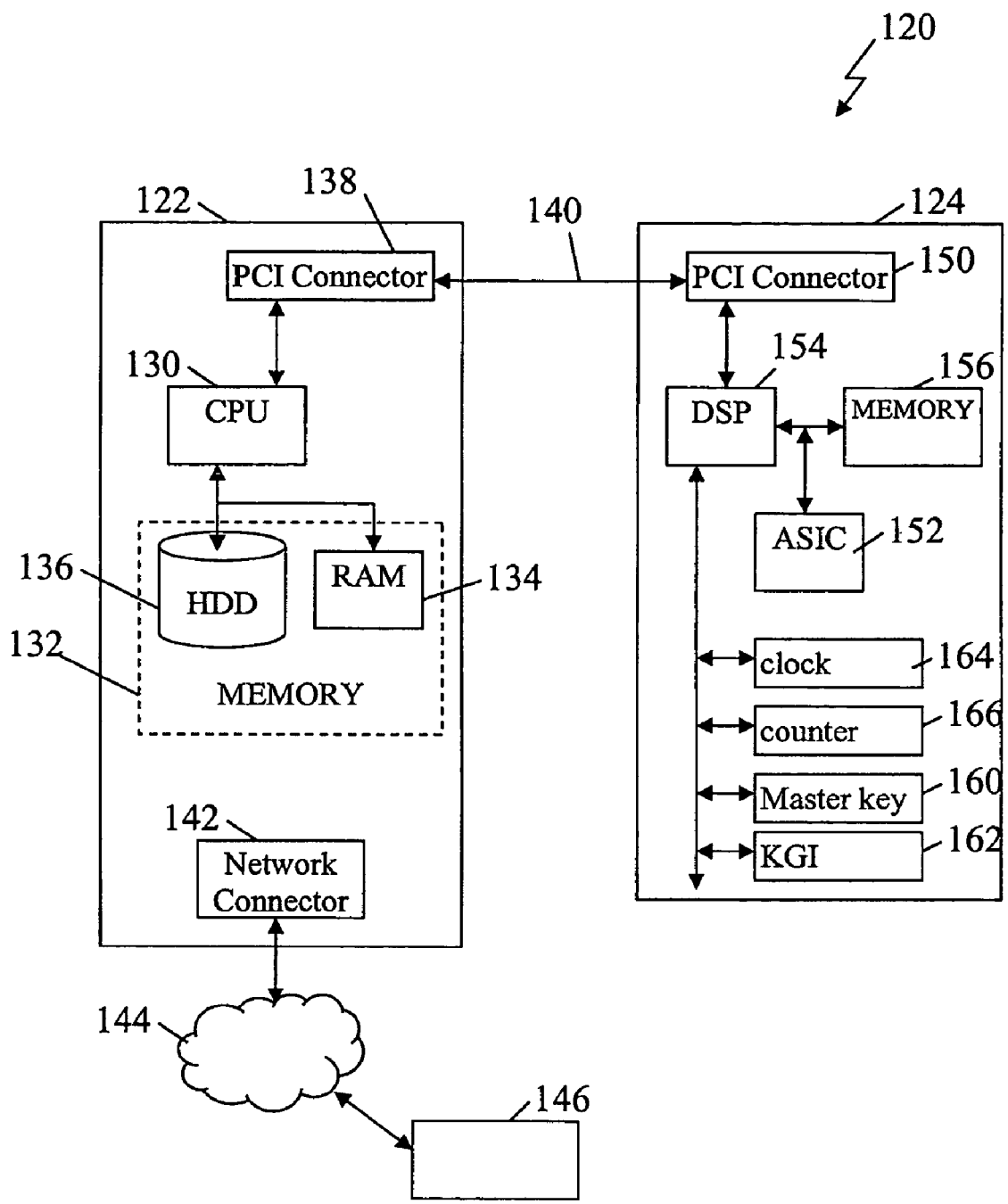
FIG. 1 depicts a simplified block diagram of a system according to some embodiments for use in decrypting content through a sub-system and/or daughter board.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various examples of the present embodiments. Also, common but well-understood elements that are useful or necessary in a commercially feasible embodiment are often not depicted in order to facilitate a less obstructed view of these various examples of the present embodiments.

DETAILED DESCRIPTION

The present embodiments provide methods and systems for use in decrypting encrypted content. The process of decrypting content, whether multimedia content, documents, audio, video, Internet, and substantially any other encrypted information and/or data, typically requires a significant amount of computational processing. The present embodiments allow for the computational processing for decryption to be shifted and/or off loaded from a main processor to one or more alternate processing devices and/or systems. In some additional embodiments, the present embodiments further allow for decryption when main processors (e.g., main or central processing units (CPU)) have low computational processing power. The shifting of the decryption to alternate systems or sub-systems is implemented while still maintaining the security of the encrypted content and content keys used to decrypt the content. As such, the present embodiments expand the secure environment in which decryption can be implemented to include an alternate and/or remote sub-system.

Many media-rendering consumer electronic devices have relatively low CPU power and/or do not have sufficient power to do heavy decryption. As such, it is often generally impractical to perform complex cryptographic and media decoding operations in the main CPU. Both cryptographic and media decoding operations are processing-intensive operations. It is desirable to delegate this processing to supporting devices. Some systems employ digital signal processor chips (DSP) to do decoding and rendering operations.

Problems arise, however, when attempting to delegate decryption of content. More specifically, some encryption standards, such as the digital transmission copy protection (DTCP), do not permit the transfer of unencrypted encoded content, even within a device when such transfer takes place over communication links that are potentially externally accessible. The DTCP specification relies on strong cryptographic technologies to provide flexible and robust copy protection across digital buses. Generally, however, the DTCP does not allow unencrypted content to be transmitted over a user accessible bus, such as a PCI bus and/or other communication links within and/or external to systems.

Combined with the performance constraints of CPUs of many devices, the present embodiments provide systems and methods that avoid the necessity of content being decrypted/re-encrypted in the CPU. Alternatively, the present embodiments allow the originally encrypted content to be passed to a sub-system and/or daughter board over an accessible communication link while still maintaining the security of the content and the system. As such, the present embodiments extend the protective processing environment across the communication link (e.g., a main PCI bus) to another processing chip and/or board (e.g., ASIC). In some preferred embodiments, this additional processing chip works in cooperation with a DSP to further distribute the processing, and thus further free up the CPU.

Many security and tamper resistance design guidelines specify that the control of a content encryption key typically is not to be released outside a tamper resistant envelope, for example, out side of a digital rights management (DRM) envelope and/or engine. This constraint ensures that a content key (used to decrypt encrypted content) is at substantially all times protected in a tamper resistant environment. Further, the use of content keys typically are further limited to use only under the rules specified in the content license, rules which are not typically enforced in the supporting hardware. Therefore, the problem of transferring the computation processing of decryption from a main CPU to an alternative and/or peripheral processor is often prevented because the alternative and/or peripheral processor is external to the secure envelope preventing the transfer of the content key used for decryption.

The present embodiments allow for the transfer of the original content key to an alternate processor, such as a sub-system and/or daughter board where the key is no longer under the exclusive protection and governance of the protective envelope (e.g., DRM subsystem), while still meeting the above CPU and DTCP constraints. By employing added protection for the content and/or content keys used in encrypting content, the present embodiments expand the protective environment and/or create a satellite protected environment. In some embodiments, the expanded environment is implemented by establishing one or more authenticated sessions between the CPU and the remote sub-system allowing the transfer of the encrypted content and content keys.

FIG. 1 depicts a simplified block diagram of a system 120 according to some embodiments for use in decrypting content through a sub-system and/or daughter board 124. The decryption is implemented in the sub-system while still maintaining the security constraints and/or controls. The system includes a main system and/or circuit 122 with a CPU or other processor 130, memory 132 which can include random access memory (RAM) 134, hard disc drive (HDD) 136, read only memory (ROM), optical memory, and/or substantially any other memory or combination of memory. The main system further includes a communication link connection 138 (such as a peripheral component interconnect (PCI) connector or other such bus connectors) that couples with an externally accessible communication link 140, such as a PCI bus. In some embodiments, the main system 122 further includes a network connection 142. The network connection allows the main system to communicate over a network 144, such as the Internet, an Intranet, and other such distributed networks. For example, the network connection 142 allows the main system 122 to couple with remote devices 146, such as remote servers, remote memory and other such devices to receive data and information, such as encrypted content and content keys.

The sub-system 124 includes a corresponding communication link connector 150, such as PCI connector or other such bus connectors, that couples with the communication link 140 allowing communication between the main system 122 and the sub-system 124. In some embodiments, the sub-system is an external system coupled with the main board. The subsystem, in some implementations, is directly coupled with the main board, for example, as an expansion card added to a computer within which the main board operates. In some alternative embodiments, the sub-system is a separate and remote component, such as an external computer coupled with the main board 124 over a link, a network and/or a distributed network.

The sub-system 124 includes a decryption circuit 152 cooperated with a media decoder 154. The decryption circuit 152 is implemented through substantially any relevant decryption circuitry and/or software, such as a processor, microprocessor, application-specific integrated circuit (ASIC), a central processing unit (CPU) and other such relevant devices and/or device employing software. Similarly, the decoder 154 is implemented through substantially any relevant circuitry and/or software, such as a digital signal processor (DSP), a dedicated hardware decoder (e.g., decoding chip that performs, for example, MPEG-4/AVC decoding), and other relevant circuitry and/or software.

The decryption processor 152 is included in the sub-system 124 that provides decryption processing. In some embodiments, the decoder is implemented through a digital signal processor (DSP) 154 that decodes and provides access to the decrypted content, such as renders multimedia content. Typically, the sub-system further includes memory 156, such as RAM, HDD, ROM, optical memory, and/or substantially any other memory or combination of memory.

In some embodiments, the decoder 154 is implemented through a dedicated hardware decoder (e.g., decoder chip). Additionally and/or alternatively, the sub-system 124 is implemented in some embodiments with a central processing unit (CPU) that performs at least part of the decryption and/or decoding. In some alternatively embodiments, the decryption circuit and the decoding circuit are integrated into a single chip. Other relevant hardware and/or software can similarly be employed to achieve at least the desired decryption and decoding achieved through the sub-system 124.

The present embodiments maintain the DTCP constraints and the encryption security even though the content is forwarded outside the main system 122 protection envelope. A secure mechanism is provided through the present embodiments for delivering one or more content keys to the sub-system and/or daughter board 124, secure storage and handling of the keys in the sub-system 124, and enforcement of licensing limitations and/or governance. For example, in some embodiments, effective lifetimes are set for content keys once released to the sub-system 124.

The security of the encrypted content and/or data is maintained, at least in part, by transferring the content while still in the encrypted form directly to the sub-system. The main system does not perform decryption of the content forwarded to the sub-system. As such, the content is communicated over the PCI bus 140 (or other accessible communication link) while still encrypted. The system 120 further encrypts content keys and communicates the encrypted content keys over the public link to further protect the content and the content keys.

By forwarding the encrypted content to the sub-system 124 for decryption, the present embodiments avoid having to decrypt the content through the main CPU 130, free up the CPU for alternative processing and/or allow for a less powerful CPU to be employed in the main board 122. Further, the security of the content and keys communicated to the sub-system 124 are maintained by forwarding the content and keys as encrypted data. The encryption and decryption is achieved through a shared secret (and/or combination of secretes) that is restricted to the main system 122 and sub-system 124, and not communicated between the main system and sub-system. Avoiding the communication of the shared secret between the main system and sub-system greatly reduces the potential that the shared secret will be compromised.

The present embodiments provide a security solution that includes a secure mechanism for delivery of the content key to the hardware sub-system, secure storage and handling of the key in the ASIC 152. In some embodiments, a symmetric encryption method is employed that creates a shared encryption key between the main CPU 130 and the ASIC 152 that is known to no other component or party. The shared encryption key is not communicated between the CPU and the ASIC. Alternatively, a common key is known in the CPU and is derived or generated at the ASIC utilizing a parameter, referred to below as a key generation indicator (KGI) 162, that is externally provided by the CPU. The parameter can be substantially any type of uniquely identified parameter, such as a counter, a code, or other such parameters. The ASIC 152 utilizes the KGI along with an internal master key (MK) 160 that is maintained solely within the ASIC to derive the common key that is used by the ASIC in decryption. In some embodiments, the ASIC generates the common key defined as an instance key (IK) as a function of both the master key and the KGI (i.e., IK=j(MK, KGI)) and independent of the main system. In some preferred embodiments, the master key is burned and/or recorded within the ASIC when manufactured. The master key is not communicated outside the ASIC.

Similarly, the main system 122 contains software, such as a digital rights manager (DRM) that establishes secure communications with the sub-system 124. In some embodiments, a version of the DRM software is stored at the main system and/or within the CPU 130 where the DRM has a predefined instance key (IK) defined and/or burned into the software. This predefined instance key is specifically related to the ASIC 152 of the sub-system 124. Typically, the version of the DRM software is provided by the manufacture and/or distributor with an instance key previously burned into the DRM by the manufacturer that is specifically associated with a corresponding KGI value. The CPU utilizes the instance key to encrypt one or more content keys that can be used to decrypted specific content. The encrypted keys are supplied to the ASIC along with the KGI value to allow the ASIC, using the internally known master key and the externally supplied KGI value to derive the instance key (IK) and decrypt the content key(s). Once content keys are obtained, the ASIC can further decrypt content and/or data encrypted by a supplier with the content key(s).

In some embodiments, the ASIC 152 supports simultaneous decryption of multiple sessions. For example, content can be divided into tracks each defining a session, and/or tracks can be further divided into sessions (e.g., multimedia content can include multiple tracks each consisting of one or more audio sessions and one or more video sessions). The instance key is utilized to encrypt a content key and a lifetime of the content key for each track and/or session of content at the DRM. Similarly, the decryption of each session is realized by utilizing the instance key as generated at the ASIC independent of the main system.

In some embodiments, the encryption and decryption of the content for each session to be communicated to the sub-system is realized with a different session key for each session. The session key is generated based on the instance key such that the security provided by the instance key and the ability to revise the instance key is still maintained. A session key is utilized to encrypt the content key for a defined track and/or session of content at the DRM. The use of session keys, in some embodiments, increases the expected lifetime of an instance key.

To provide for simultaneous decryption of multiple tracks of content, the ASIC 152, in some embodiments, is implemented with multiple slots, where each track is assigned a slot. The slots are utilized to define and/or store a content key for the track of the content associated with the slot. In some embodiments, the slots include additional parameters for cooperating the communication, encryption and/or decryption between the main system 122 and the ASIC 152, such as a challenge value, a timer, and/or other parameters as fully described below. The ASIC maintains an internal clock 164, used to decrement the remaining life of the content key associated with each slot. When the remaining life of a content key expires (e.g., reaches zero), the content key is disregarded, and subsequent requests to decrypt content using that content key fails (until a new content key/lifetime pair is received).

The DRM subsystem and the ASIC use the shared secret to negotiate sessions and generate instance keys and/or session keys. In some embodiments, the instance keys are used to encrypt the content keys and defined lifetimes for the content keys, where the content keys typically have expiration periods less than or equal to that defined in a license. To prolong the active life of the ASIC 152, which is hardware and generally hard and/or expensive to replace, the shared secret scheme is used. The ASIC contains the master key burned in at manufacturing, and in some embodiments a secure counter that stores the KGI. The master key is not used or exposed outside the ASIC. Alternatively, the instance key is generated as a function of the master key and the KGI. The instance key is used to encrypt and decrypt content keys, other parameters, and in some implementations further encrypt the content. The combination of a KGI and the corresponding instance key define, at least in part, the shared secret in some embodiments. The DRM software is similarly supplied by the manufacture/distributor with a specific instance key and KGI pair embedded in the software.

The system 120 maintains the security of the system, in part, by revising at least the instance key when it is suspected the instance key has been compromised and/or externally determined. For example, when it is suspected that an instance key has been exposed, a software update is provided distributing new and/or revised DRM software, with a revised instance key and a corresponding new KGI value (e.g., old KGI+1). The CPU 130 forwards to the ASIC 152 the new KGI value (typically along with additional data and/or parameters, such as an encrypted content key and lifetime). The ASIC compares an internal $KGI_{ASIC}$ value, with the received $KGI_{DRM}$ value to verify the generated instance key. When the KGI values do not match, the ASIC increments and/or adjusts a counter 166 (e.g., KGI counter) such that the internal $KGI_{ASIC}$ matches the received $KGI_{DRM}$. Further, the ASIC can no longer support older software and/or decrypt content encrypted according to old KGI value. Still further, the KGI counter, in some preferred implementations, is not reversible, and only counts in one direction. The KGI counter, therefore, cannot be reversed to allow for decryption with older versions of content keys. Thus, the present embodiment provides for the renewability of the security of the system even after an instance key has been exposed without having to replace hardware components (e.g., ASIC), and greatly expands the operating life of the system 120 and the security of the system by, at least in part, establishing a new instance key.

The present embodiments further mimic the governances and/or authority provided by the original content key in the sub-system 124. In some embodiments, the mimicking of the governances is achieved at least in part by timing out the content keys supplied to the sub-system. By establishing expiration times for the content key to expire after a period of time provides additional security. If a user or system tries to use an expired instance key, the system detects the expired time, and has to communicate back with the DRM to try and re-negotiate an updated or new time. The DRM, at that time, detects the expiration and determines whether the ASIC should receive additional access to the content. Because the key expires in the ASIC the governances of the original content key are enforced in this remote processor (e.g., ASIC 152).

Figure 2:
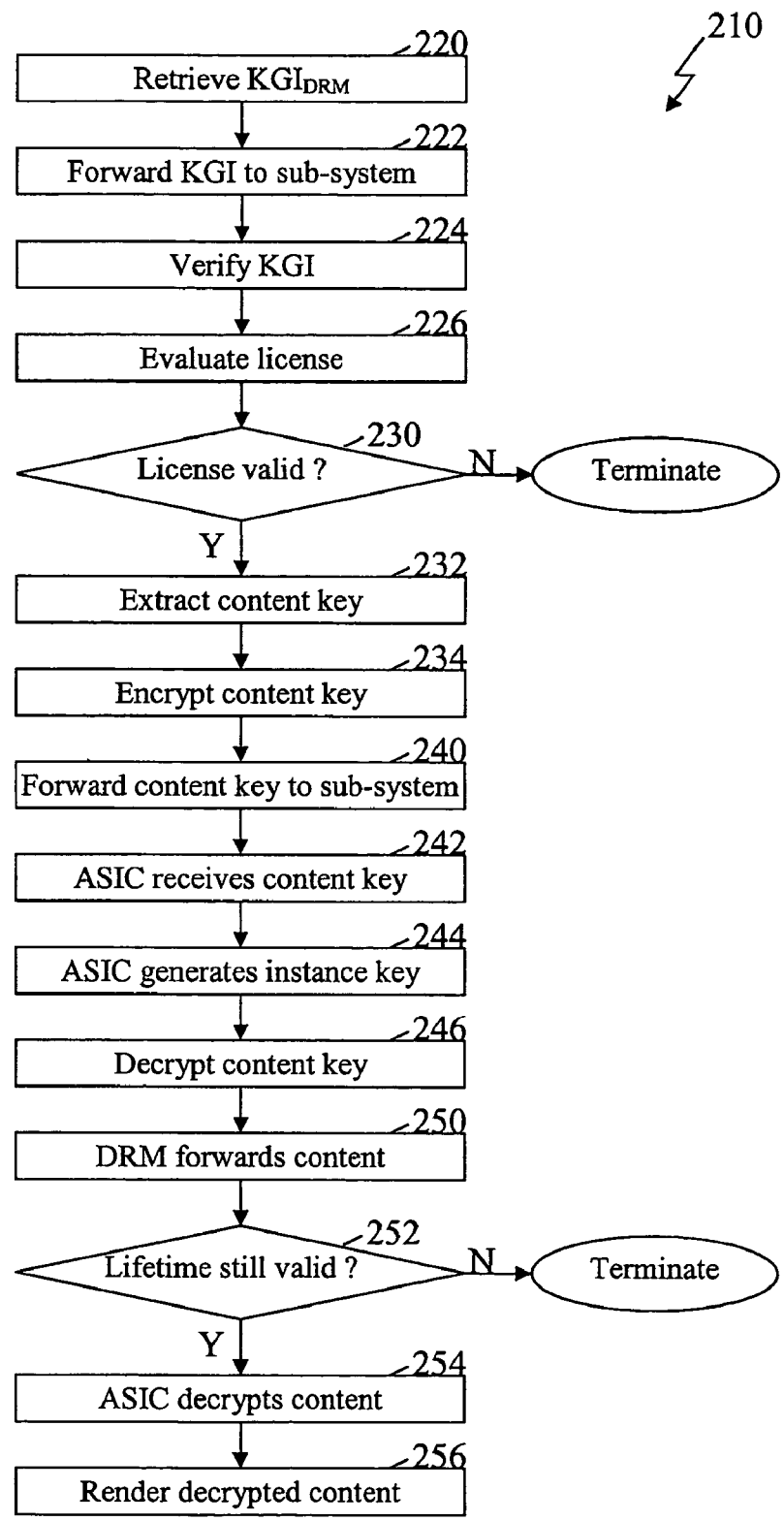
FIG. 2 depicts a simplified flow diagram of a process for use in decrypting content in a subsystem.

In operation, the system 120 establishes communication between the main system 122 and the sub-system 124 according to predefined conditions, and forwards encrypted content to the sub-system for decryption to allow access to the content and/or to display the content. FIG. 2 depicts a simplified flow diagram of a process 210 for use in decrypting content in a sub-system. As initial conditions, the main system (e.g., main system 122) includes control software, such as DRM software, with a KGI value and an instance key incorporated or burned into the software by the manufacturer. Similarly, the sub-system 124 includes a processor, such an ASIC 152, that decrypts the content based on received keys as describe fully below. The ASIC includes a counter 162 (e.g., KGI counter), and a master key that is incorporated and/or burned into the ASIC.

In step 220, the main system 122 retrieves the KGI value. In some embodiments, the KGI value is retrieved by DRM software. In step 222, the DRM forwards the KGI value to the sub-system 124, which is directed to the ASIC 152. In step 224, the ASIC verifies the KGI value with respect to the internal KGI counter value. In some preferred embodiments, the ASIC determines whether the received KGI value is less than the internal KGI value. When the received KGI value is less than the internal KGI value, the process terminates and in some implementations issues an error code. Alternatively, when the received KGI value is equal to or greater than the internal KGI value, the internal KGI value is adjusted to equal the received KGI value in some embodiments and the process 210 continues.

In step 226, the DRM evaluates a license for desired content. The license is typically received through an external source. For example, in some instances, the license is obtained over the distributed network 144 from an external supplier. In some implementations, the license is encrypted prior to being communicated over the distributed network and is decrypted at the main system 122. The content key or keys are often maintained within the license and extracted by the main system once the license is decrypted.

In step 230, the process 210 determines whether the license is valid. If the license is not valid, the process terminates, and/or requests an updated license. When the license is valid, the process continues to step 232 where the DRM extracts a content key for the desired content associated with the license. In step 234, the DRM encrypts the content key and a content key lifetime, where the encryption is implemented using the instance key (IK) internally known to the DRM. The process then continues to step 240 where the encrypted content key and content key lifetime are forwarded to the sub-system, for example forwarded over a PCI bus 140 or other communication link.

In step 242, the ASIC receives the encrypted content key and lifetime. In step 244 the ASIC determines and/or generates the instance key using the master key and the verified KGI value. In step 246, the ASIC decrypts the content key and lifetime with the generated instance key. In step 250, the DRM forwards the desired encrypted content to the sub-system 124. The desired content can be received over the network connection 142 and/or stored locally at the main system 122 (e.g., stored in and/or from a portable medium such as a disk, compact disk). The ASIC evaluates the lifetime of the content key to verify that the content key is still valid in step 252. When the lifetime has expired, the ASIC does not decrypt the content, and terminates. In some implementations, the ASIC further forwards a message indicating the lifetime has expired. When the lifetime is valid and has not expired the process 210 continues to step 254. In step 254, the ASIC decrypts the content with the decrypted and recorded content key. In step 256, the decrypted content is rendered for access and/or viewing by a user or other systems.

By maintaining the instance keys inside the DRM and independently deriving the instance key internal to the ASIC, the system 120 avoids the need of communicating the instance key across the PCI bus 140 and thus avoids the possibility of interception of the instance key that would allow an intercepting party to decrypt the content key and access the content if the content is similarly intercepted. As such, the present embodiments maintain the security of the encrypted content while allowing the distribution of the decryption processing to the sub-system, saving the main system 122 and CPU 130 resources for other processing, and in some embodiments improving the speed of decryption by allowing a more powerful device (e.g., the ASIC) to implement the decryption.

As introduced above, some embodiments allow the simultaneous decryption of multiple sessions of content. In some implementations, a fixed amount of content can be divided into multiple sessions for simultaneous decryption. Additionally and/or alternatively, some content includes multiple tracks, for example a track of video content and a track of audio content. As such, some preferred implementations provide the simultaneous decryption of multiple tracks. In some embodiments, the ASIC is configured with multiple slots. Each slot is utilized for the decryption of a track of content. The DRM in encrypting and forwarding content keys further specifies a slot for which the content key is to be applied.

Figure 3:
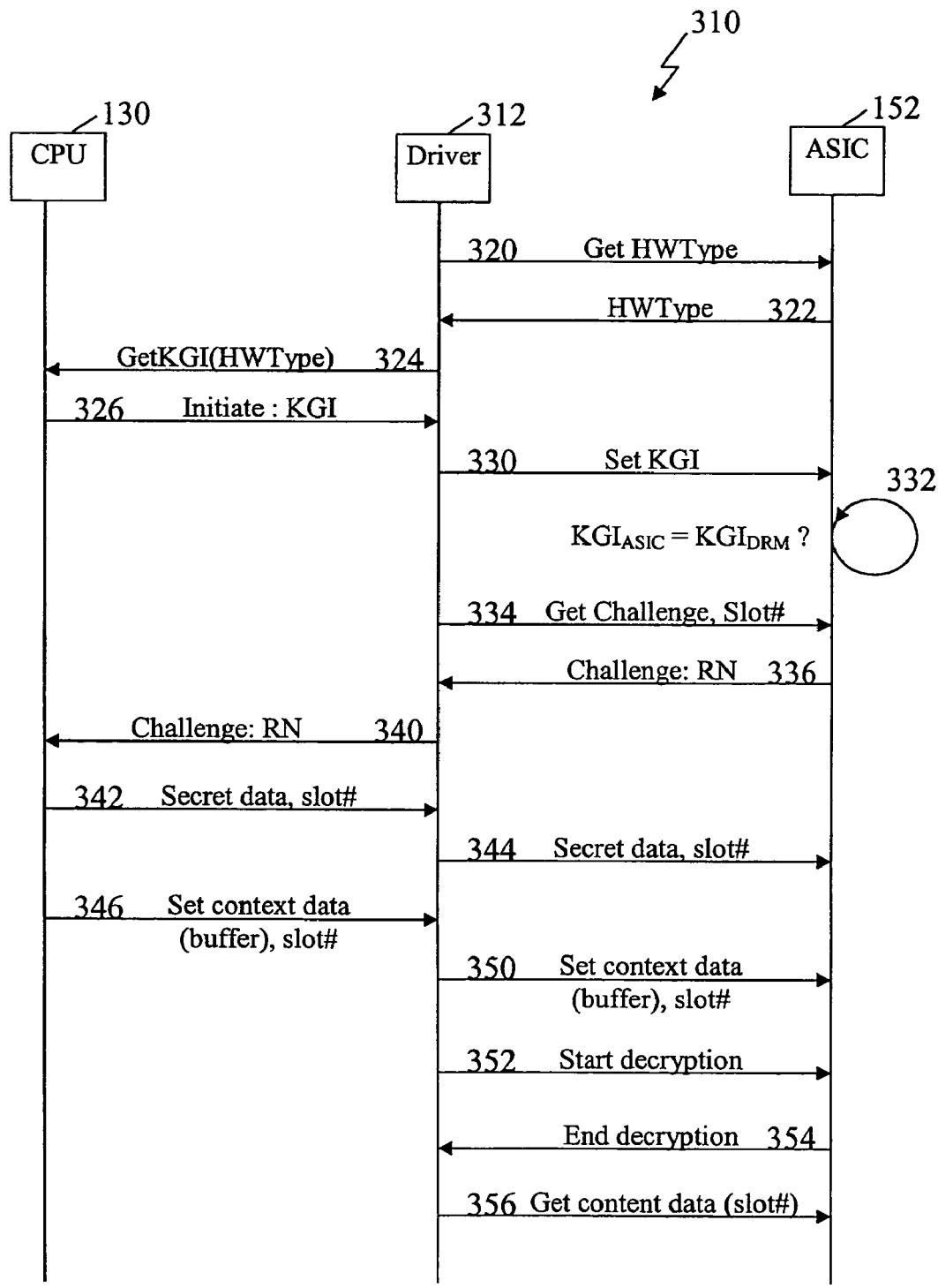
FIG. 3 depicts a simplified process diagram showing the interaction between the CPU, a driver, and an ASIC of the sub-system.

FIG. 3 depicts a simplified process diagram 310 showing the interaction between the CPU 122, a driver 312 (such as a driver operated on the remote sub-system, and in some implementations operated by the DSP 154), and the ASIC 152 of the sub-system 124. The driver 312 forwards a request 320 to the ASIC 152 requesting a hardware type from the ASIC. The ASIC, returns a reply 322 with a hardware type to the driver, which in turn forwards the hardware type to the CPU in communication 324. The CPU generates an initialization message ($MSG_{Init}$) that includes a local KGI value (e.g., the DRM KGI value ($KGI_{DRM}$)), and communicates 326 the initialization message. The driver communicates 330 the initial message to the ASIC so that the ASIC can verify and/or set a KGI stored at the sub-system. The ASIC verifies 332 that the stored $KGI_{ASIC}$ is equal to or less than the received $KGI_{DRM}$. If the $KGI_{ASIC}$ is greater than the received $KGI_{DRM}$, the ASIC ignores the initial message. Alternatively, if the $KGI_{ASIC}$ is less than the $KGI_{DRM}$, the ASIC sets the $KGI_{ASIC}$ equal to the received $KGI_{DRM}$. If the $KGI_{ASIC}$ is equal to the $KGI_{DRM}$ or is made to equal the $KGI_{DRM}$, the process continues.

The driver 312 submits a requests 334 with a challenge message ($MSG_{chal}$) for a given slot number. The ASIC in turn generates a challenge random number ($RN_{chal}$) that is associated with the specified slot number, and generates and returns 336 a challenge message that includes the random number, which is encrypted in some embodiments with the instance key. The driver forwards 340 the challenge message to the CPU 122. The random number at least in part provides protection from replay attacks on the protocol. Additional security is also provided through the encryption of the challenge message in attempts to prevent successful middleman attacks. Further, both the encryption and the random number verify the validity of the CPU software as described below.

The CPU encrypts the content key and other parameters using the instance key, and generates a reply 342 with encrypted parameters (e.g., encrypted content key and lifetime of the key) along with the identifying slot number and an adjusted random number (e.g., RN+1) used by the ASIC in verifying the return message. The adjusted random number verifies that the CPU software was able to decrypt the challenge message, for example, by knowing the instance key that corresponded with the current KGI value. The driver forwards 344 the encrypted parameters to the ASIC.

The CPU begins forwarding 346 desired encrypted content for decryption and rendering. In some implementations, the amount of encrypted content forwarded to the ASIC is forwarded in limited bursts. The driver 312 forwards the encrypted content 350 to the ASIC. Further, the driver forwards a decryption initiation command 352. Upon completion of decryption (of at least a portion of the content) the ASIC notifies 354 the driver of the completed decryption. The driver directs 356 the ASIC to forward decrypted content for rendering (e.g., forwarding the content to a DSP for rendering). In some embodiments, further content security is achieved by encrypting each track of the content in blocks. The driver forwards the blocks to the ASIC and uses the ASIC to decrypt the track a block at a time. The decrypted blocks are then forward to the DSP for decoding and rendering.

Figure 4:
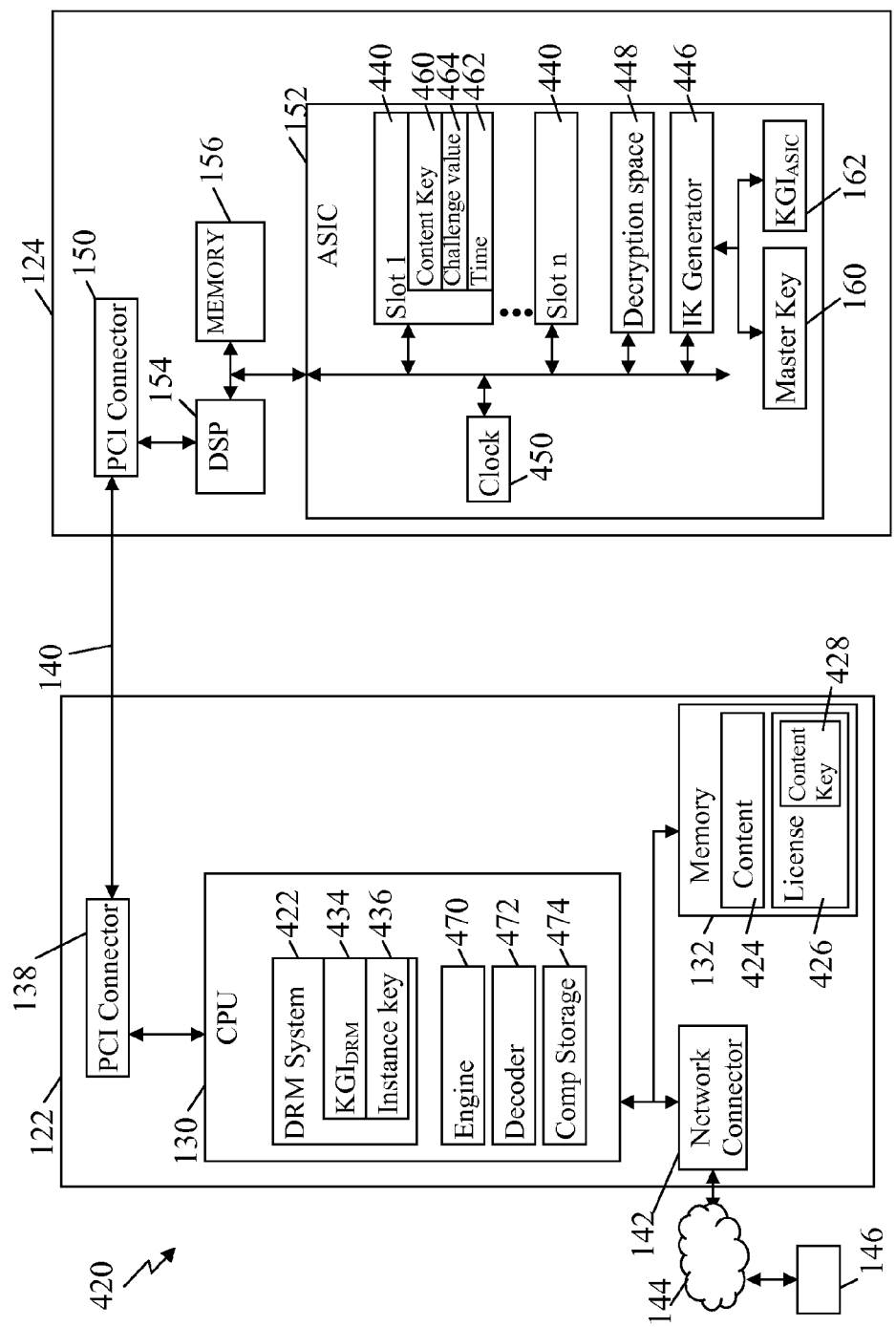
FIG. 4 depicts a simplified block diagram of a system that is similar to the system of FIG. 1.

FIG. 4 depicts a simplified block diagram of a system 420 that is similar to the system 120 of FIG. 1. The system 420 includes a main board 122 coupled with a sub-system 124 over a communication link 140, such as a PCI bus or other such communication link. The main board includes a CPU 130 that operates a DRM subsystem 422. The CPU couples with one or more memory devices 132 (e.g., RAM, HDD, and the like) that stores one or more tracks of encrypted content 424, and one or more licenses 426 for accessing the content. In some implementations, the license further includes at least one content key 428 for the decryption of encrypted content 424. A network connection 142 is further included that allows the main system 122 to communication over external networks 144 with one or more external devices 146 on the networks. In some implementations, the main system 122 receives encrypted content and the encrypted content key, often embedded in a license(s), from one or more external devices 146 through the external network 144.

The DRM subsystem 422 is supplied to the main system with a KGI value 434 and a DRM instance key 436 ($KGI_{DRM}$) predefined and/or burned into the DRM. As introduced above, the DRM utilizes the DRM instance key to encrypt one or more content keys 428 prior to forwarding the content key to the sub-system 124.

The sub-system 124 includes a communication link connection 150, a DSP 154, memory 156, and a processing unit such as an ASIC 152. The DSP decodes unencrypted content, and in some embodiments includes the driver 312. The ASIC further includes multiple slots 440 that are utilized in identifying and simultaneously decrypting multiple tracks of encrypted content. The ASIC can include substantially any number of slots depending on an intended use, computational capacity, resources and other such parameters. A slot 440 maintains a decrypted content key 460 and a lifetime 462 of the decrypted content key for a predefined content track. In some embodiments, the slots are implemented through an internal memory. The slot further includes a challenge value 464 in some implementations as fully described below, and/or other parameters for the predefined track of content. As discussed above, the ASIC includes a slot for each track of content to be simultaneously decrypted.

A master key 160 is included and/or burned into the ASIC upon manufacture and/or prior to distribution. Typically the master key is a unique key specific to a single ASIC. One or more KGI values 162 are further included in the ASIC and/or retrieved from memory 156 and utilized by an instance key generator 446 in generating and/or deriving an instance key independent of the main system. One or more decryption devices or circuits 448 are further included in the ASIC, in some embodiments, that decrypt encrypted content keys and the desired encrypted content utilizing a generated instance key and the decrypted content keys, respectively. In some preferred embodiments, the ASIC further includes one or more counters and/or clocks 450 that track the life time of a decrypted content key.

In some embodiments, the CPU 130 of the main system 122 further implements a content engine 470 in retrieving and rendering desired content. When the content engine is initiated and/or created it further initiates and/or creates a decoder element 472 and a component storage element 474 for each encrypted track and/or stream of the desired content (e.g., some video content includes two tracks, one for video, and one for audio). The decoder 472, at least in part, evaluates the content license for one or more associated streams, establishes a session between the CPU 122 and the ASIC 152, and initiates the transfer of the encrypted content key for each track between the DRM subsystem 422 and the ASIC using the shared secret. The content engine 470 transfers the still encrypted and encoded content 424 to the DSP 154 of the sub-system 124 for decoding and rendering. The DSP passes the encrypted content to the ASIC 152 for decryption. The ASIC decrypts the content and returns the decrypted content to the DSP for rendering. In some preferred embodiments, following the decryption of the track, the ASIC then lightly encrypts the content and returns the re-encrypted and still encoded content to the DSP. The DSP then decrypts, decodes, and renders the content.

Figure 5:
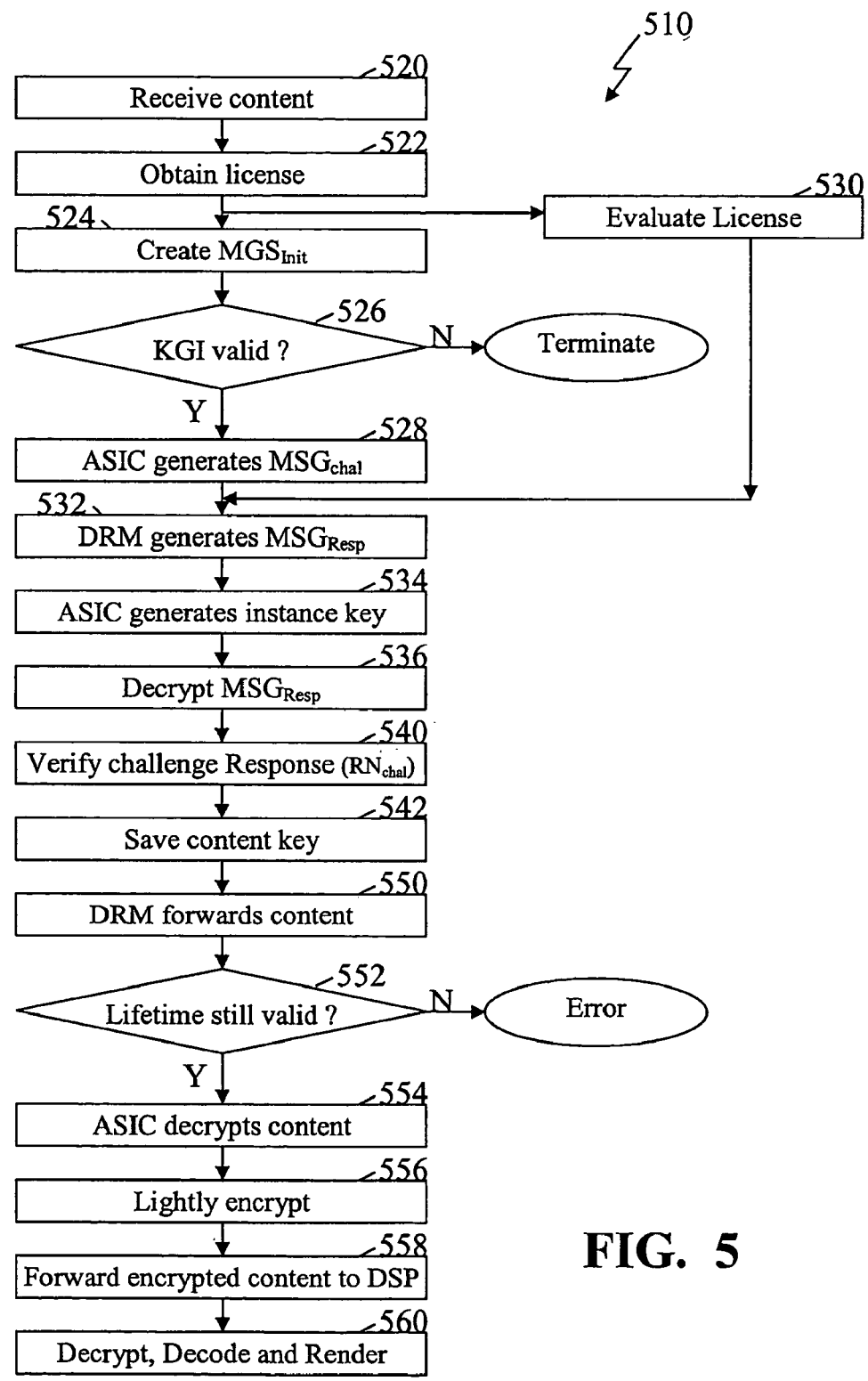
FIG. 5 depicts a simplified flow diagram of a process for use in decrypting encrypted content, such as multimedia data and substantially any other encrypted data.

FIG. 5 depicts a simplified flow diagram of a process 510 for use in decrypting encrypted content, such as multimedia data and substantially any other encrypted data. With multimedia data, the data often includes multiple tracks or streams of content (e.g., at least two tracks, an audio and a video track), where each track is typically encrypted with a unique content key. The DRM software (maintained at the main system 122) when distributed includes a defined KGI value and a corresponding instance key (typically associated with predefined hardware, such as a predefined ASIC of the sub-system 124). Similarly, the ASIC is configured, typically at manufacture and/or prior to distribution, to include a master key (MK), a current KGI value, and further includes the capacity to generate the instance key as a function of the master key and the KGI value ($f(MK, KGI)$).

Still referring to FIG. 5, the process initially retrieves one or more protected content files in step 520. Typically, the desired encrypted content is stored locally at the main system 122 and/or retrieved through the network connection 142. In step 522, the main system further obtains a license to access the content, where the license governs the use of one or more of the content files, and defines rights to access/play the content. For example, a user can pay for and receive a license that gives access to content file(s). Upon activation to access content (e.g., user initiates a play command), step 524 is entered where the DRM creates an initial message ($MSG_{Init}$) to be forwarded to the ASIC that includes the KGI value that is internal to the DRM ($DRM_{KGI}$), and a defined channel or slot. As introduced above, the ASIC in some embodiments allows for the decryption of multiple tracks through multiple sessions. The ASIC utilizes slots to distinguish between tracks and maintain parameters relative to each track. Typically, the DRM knows which slot(s) the ASIC is not currently using, and identifies one of those unused slots in the initial message (e.g., $MSG_{Init}=(KGI_{DRM}, slot\#)$). Further communications and/or commands between the DRM and the ASIC are identified with the slot number to distinguish between the potentially multiple tracks being decrypted.

In step 526, the ASIC compares the local KGI ($KGI_{ASIC}$) with the received KGI value ($KGI_{DRM}$). If the $KGI_{ASIC}$ is greater than the $KGI_{DRM}$, the process terminates, and in some embodiments, the ASIC generates an error message. Alternatively, if the $KGI_{ASIC}$ is equal to the $KGI_{DRM}$, the process continues to step 528. Similarly, if the $KGI_{ASIC}$ is less than the $KGI_{DRM}$, the ASIC sets the $KGI_{ASIC}$ equal to the $KGI_{DRM}$ and continues to step 528. The verification of the KGI, at least in part, allows for the present embodiments to maintain the protection of the content and content keys in the sub-system in the event that the security is potentially compromised (e.g., it is believed that an instance key has been exposed), and allows for the renewability of the security provided by the present embodiments as fully described above, and further described below.

In step 528, the ASIC generates challenge message ($MSG_{chal}$), which in some embodiments is encrypted with the instance key, and sends the challenge message back to DRM. The challenge message allows for verification. In some embodiments, the challenge message includes a challenge number (e.g., a random number ($RN_{chal}$) generated by the ASIC, the KGI number internal to the ASIC ($KGI_{ASIC}$), and the corresponding slot number identifying to which slot the challenge is related (e.g., $MSG_{chal}= \{RN_{chal}|KGI_{ASIC}|slot\#\}$). The ASIC stores the generated challenge number generated for later verification.

Step 530 is performed at some time prior to step 532, and often performed concurrently with one or more of steps 520-526. In step 530, the DRM evaluates the license to verify the use and rights to the desired content, and retrieves and/or extracts the content key (CK), typically from the license, when the license is verified. The evaluation of the license can be initiated at substantially any time during the process 510 prior to step 532 and is independent of the other steps.

In step 532, the DRM generates a response to the challenge message ($MSG_{Resp}$) that is forwarded back to ASIC. In preparing the response to the challenge message, the DRM verifies the $KGI_{ASIC}$ value received from the ASIC to determine whether an upgrade to the KGI value is needed. If an upgrade is needed, the DRM generates an error message, and/or initiates a request for an update, which in some embodiments is implemented through an upgrade of the DRM software and/or replacement of the DRM software. The DRM further extracts the challenge number generated by the ASIC and adjusts the challenge number according to a predefined function (e.g., increments the random number by 1 ($RN_{chal}+1$), doubles the random number, or performs some other function for later verification) in preparing the response to the challenge message. The content key and the lifetime (and/or remaining play time) of the content key for the defined slot number is retrieved, and in some implementations an initial vector (IV) according to a content decryption algorithm is determined and/or extracted. The DRM encrypts the content key, the lifetime and the adjusted random number, and incorporates these parameters into the response to the challenge ($MSG_{Resp}$), using the instance key to ensure protection of the content key. In some embodiments, the response to the challenge further includes the initial vector, the adjusted challenge number, and the slot number. Further, the response to the challenge in some implementations further encrypts some of the additional parameters incorporated into the response. For example, the response to the challenge encrypts the adjusted challenge number, the content key, the initial vector, the slot number and the lifetime of the content key (e.g., $MSG_{Resp}=(IV, RN_{chal}+1|CK|IV|slot\#|Time_{ck\_life})$; where $\{RN_{chal}+1|CK|IV|slot\#|Time_{ck\_life}\}$ is encrypted). In some alternative embodiments, the entire response to the challenge is encrypted with the instance key. In some implementations where the entire response message is not encrypted, the encrypted portion further includes a validation value for the unencrypted portion (e.g., SHA1 HASH, HMAC, and the like) to further verify the integrity of the message.

In step 534, the ASIC generates the instance key by initiating an internal function that produces an instance key that corresponds to the instance key utilized by the DRM. For example, the ASIC initiates the function as discusses above utilizing both the master key (MK) and the KGI. In step 536, the ASIC decrypts at least a portion of the response message ($MSG_{Resp}$) using the generated instance key. In step 540, the ASIC verifies the response message and associates the response message with a specific challenge message. For example, the ASIC extracts the adjusted challenge number (e.g., $RN_{chal}+1$) and verifies that adjusted challenge number is equivalent to the stored challenge number similarly adjusted (e.g., incrementing by one), thus validating that the received response is a response to the specific challenge message just sent.

If the adjusted challenge number does not correspond to a saved challenge number, the ASIC ignores the response message, and in some implementations issues an error. When the ASIC verifies the challenge number match, the process 510 enters step 542 where the ASIC records and/or stores at least the content key and the lifetime (and/or remaining lifetime) of the content key and associates the content key and lifetime with the defined slot number. In some implementations, the ASIC includes internal memory defined by slots and records at least the content key and lifetime within the internal memory of the defined slot, and in some instances a challenge value is set to zero. In some embodiments, the ASIC at this point has the parameters needed to decrypt the content.

In step 550, the DRM streams the encrypted content to the sub-system 122, typically to the DSP 154, which in turn forwards a least a portion of the encrypted content to the ASIC. In step 552, the ASIC verifies that the lifetime of the content key has not expired. If the lifetime has expired, the ASIC does not decrypt the content and forwards an error message to the DRM. When the lifetime has not expired, the ASIC decrypts the content in step 554.

In step 556, the ASIC lightly encrypts the decrypted content. In some embodiments, the ASIC generates a random key (e.g., a 16-bit key), and lightly encrypts the decrypted content with the random key. In step 558, the lightly encrypted content, and the random key are forwarded back to the DSP (in some implementations, the random key and the lightly encrypted content are forwarded separately). In step 560, the DSP decrypts the lightly encrypted content, decodes the content (if encoded) and renders the content and/or makes the content available for use.

Figure 6:
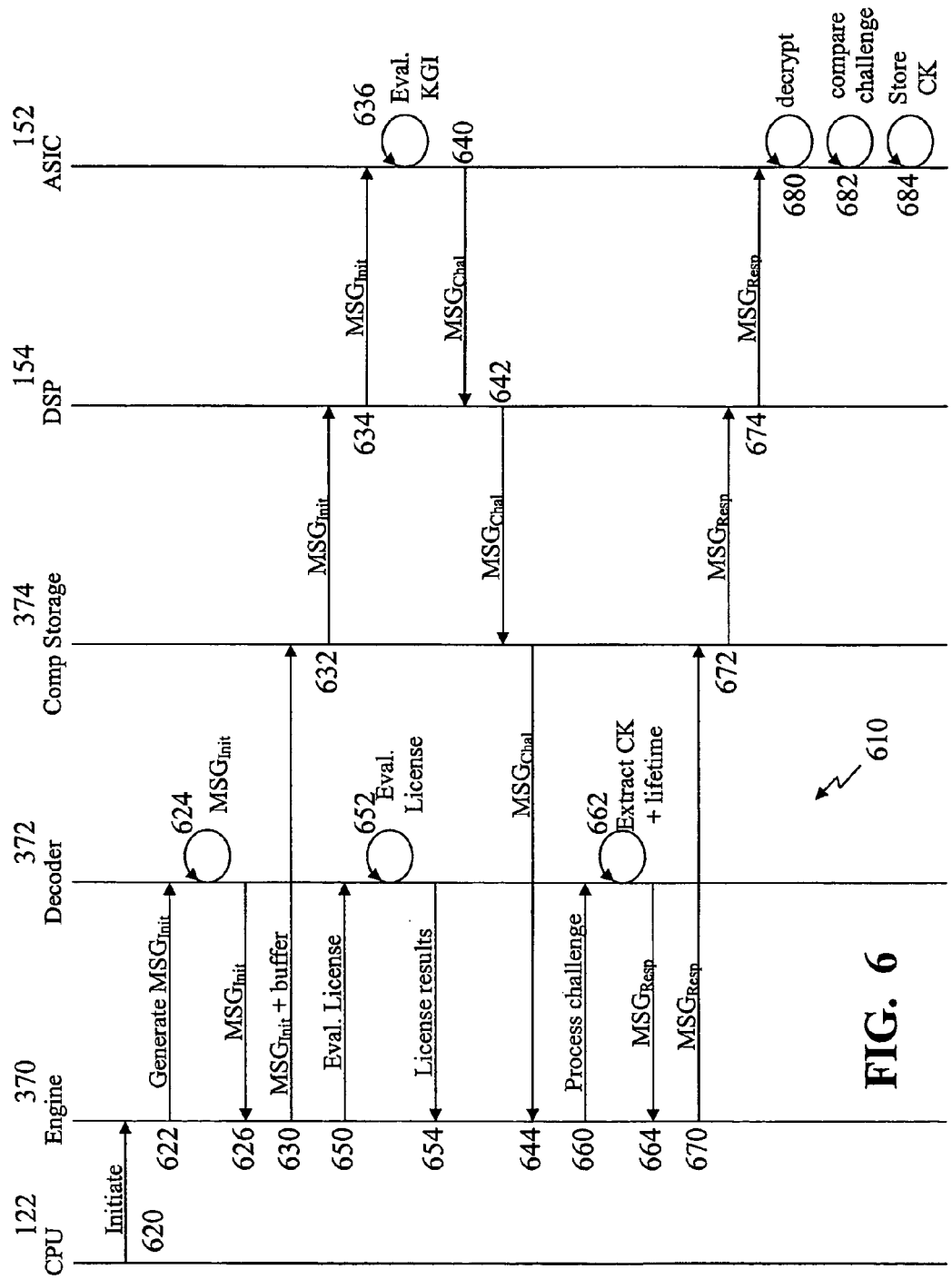
FIG. 6 depicts a simplified process diagram showing the interaction and/or communication between the CPU, content engine, decoder, component storage, and the DSP and ASIC of the sub-system, according to some embodiments.

FIG. 6 depicts a simplified process diagram 610 showing the interaction and/or communication between the CPU 122, content engine 370, decoder 372, component storage 374, and the DSP 154 and ASIC 152 of the sub-system 124, according to some embodiments. Initially, the CPU generates an initiation command 620 activating the content engine. The content engine issues a communication 622 to the decoder 372 to generate an initiation message ($MSG_{Init}$). In some embodiments, the communication 622 provides a buffer for the initiation message, defines an ASIC slot number to be used for the present session, and the hardware implementation type (e.g., as retrieved in steps 320, 322 of FIG. 3). The decoder invokes an object 624 to generate a session initialization message that utilizes the parameters received in communication 622, and retrieved information, such as the KGI of the DRM for the defined hardware (e.g., $MSG_{Init}=\{KGI_{DRM}|slot\#\}$).

The decoder returns the initialization message to the content engine at 626. The content engine 370 initiates a component storage command 630 to the component storage 374 to send the initialization message. The command 630 forwards the initialization message ($MSG_{Init}$) and defines buffer space for the response. The composition storage 374 stores the initialization message, for example in a composition cache, for retrieval by the DSP 154. The DSP retrieves the initialization message through command 632, and forwards the message to the ASIC at communication 634. The ASIC evaluates the $KGI_{DRM}$ value relative to the $KGI_{ASIC}$ value at process 636. If the $KGI_{ASIC}$ is greater than the $KGI_{DRM}$, the ASIC ignores the initialization message, according to some embodiments. Otherwise, the $KGI_{ASIC}$ equals, or is made to equal the $KGI_{DRM}$ value. Upon a verification of KGI values, the ASIC generates a challenge message 640, which is returned 642 through the DSP and component storage 644 to the content engine. In some implementations, the challenge response includes a challenge number, the $KGI_{ASIC}$ value and the slot number (e.g., $MSG_{chal}=\{RN_{chal}|KGI_{ASIC}|Slot\#\}$).

At some time prior to processing the challenge message, the content engine issues instructions 650 to the decoder to evaluate the license for the track of the current session. The decoder performs the evaluation at 652, and returns the results through communication 654, where the content engine retains the continuation data (e.g., content key, lifetime, etc.) that resulted from the evaluation. The evaluation of the license can include determining expiration of the license, verifying the license is associated with the current track and other such evaluations as are known.

The engine initiates a command 660 to invoke the decoder to process the challenge command, forwarding the continuation data from the license evaluation, challenge message ($MSG_{chal}$), and a defined buffer space for the response message. The decoder processes challenge message at 662. The processing of challenge message extracts at least the content key and remaining lifetime from the continuation data, and returns a response message 664 that includes an initial vector along with a string of data that is encrypted using the instance key (IK). In some embodiments, the encrypted string includes an adjusted challenge number, the content key, the initial vector, the slot number and the lifetime of the content key (which in some instances is a remaining play time), e.g., $MSG_{Resp}=(iv, RN_{chal}+1|CK|iv|Slot\#|lifetime)$. The content engine 370 initiates a command 670 that invokes the component storage to forward the response message, where the component storage stores the response message (e.g., in composition cache) and makes the response message available for retrieval by the DSP. The DSP initiates retrieval 672 of the response message, and forwards the response message at 674 to the ASIC. The ASIC initiates an evaluation process 680 for decrypting the response message, followed by a comparison process 682 to compare the adjusted challenge number with the initial challenge number. If a match is not detected the ASIC ignores the response message and/or returns an error. Once the challenge numbers are verified, the ASIC initiates an extraction process 684 to extract and store the content key and the lifetime in the associated slot, and in some implementations sets the challenge value in the slot to zero.

Figure 7:
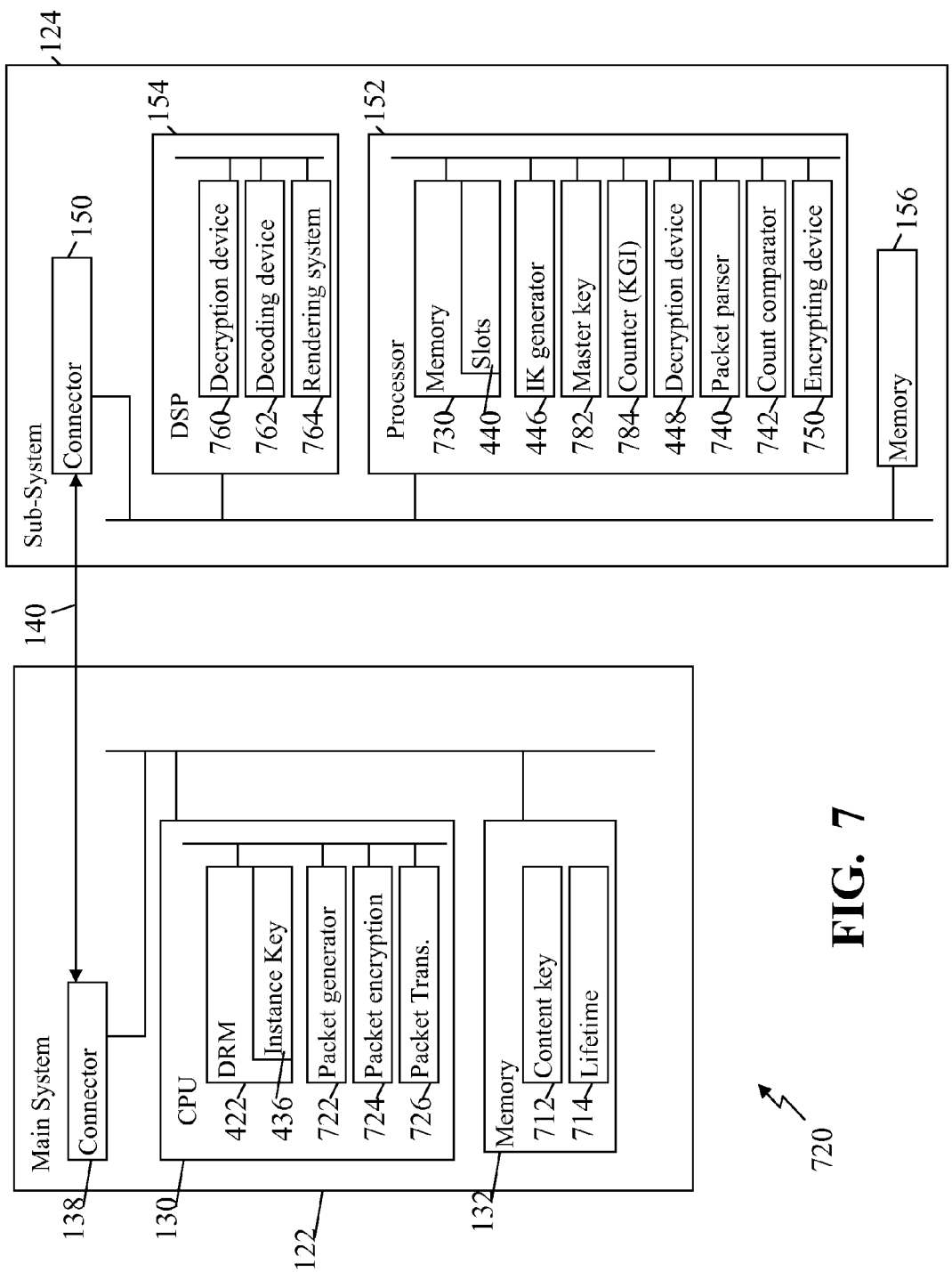
FIG. 7 depicts a block diagram of the system according to some embodiments that provides an expanded security environment.

FIG. 7 depicts a block diagram of the system 720 according to some embodiments that provides an expanded security environment. The system 720 includes a main system 122 having a processor 130 that incorporates a DRM 422. The DRM further includes an instance key 436 that is burned into the DRM. One or more content keys 712 and lifetimes 714 of the keys are stored in memory 132. A packet generation device 722, which generates packets is further incorporated into the CPU and couples with the DRM and the memory. The packet generator generates packets that include at least the content key, and typically a lifetime of the content key. A packet encryption device 724 couples with the packet generation device 722 to encrypt packets generated by the packet generator with the instance key 436. An encrypted packet transmission device 726 couples with the packet encryption device 724 and the communication link connector 138 to communicate the encrypted packet of the communication link 140 to the sub-system 124.

The sub-system 124 includes a DSP 150, memory 156 and a processor 152. The processor includes internal memory 730, with multiple slots 440 defined within the internal memory 730. The encrypted packet is received by the sub-system 124 and forwarded to the processor 152, which in turn stores the encrypted packet into a slot of the internal memory. The processor further includes an instance key generator 446 coupled with a master key 782 and a count 784, such as a key generation indicator (KGI). The instance key generator 446 utilizes the master key and the count to generate the instance key independent of the main system 122.

A decryption device and/or space 448 is incorporated into the processor 152 and couples with the instance key generator 446 and the internal memory 730. The decryption device retrieves one or more encrypted packets from the memory and utilizes the instance key to decrypt the encrypted packet. A packet parser 740 is further included to retrieve the unencrypted content key and the lifetime. The sub-system utilizes the unencrypted content key in the decryption device 448 to decrypt encrypted content stored in one or more slots 440 of the internal memory 730.

In some embodiments, the sub-system further comprises a count comparator 742 that compares a count received from the main system with the internal count 784. When the count from the main system is not within a threshold of the internal count 784 (e.g., when the count received from the main system is less than the internal count 784), the sub-system ignores encrypted packets from the main system associated with that count.

The sub-system 124 in some embodiments further includes an encrypting device 750 coupled with the decryption device 448. The encrypting device lightly encrypts the decrypted content and forwards the lightly encrypted content to the DSP. The DSP includes a decryption device 760, a decoding device 762, and a rendering system 764. The decryption device 760 decrypts the lightly encrypted content. The decoding device 762 decodes the content unencrypted by the decryption device 760. The rendering system 764 retrieves the decode content and renders the content (e.g., plays and/or displays the content), or makes the content otherwise accessible.

In some preferred embodiments, each released version of DRM software 422 contains a hard-coded value of a $KGI_{DRM}$ (which can be represented by a number, a string of defined bits, a code or other such parameters, and can have substantially any size, for example, 4 bytes) and a corresponding instance key (which similarly can be any size, and in some embodiments is 16 bytes or more) that matches a specific hardware type (e.g., a specific ASIC). The ASIC 152 is similarly manufactured and/or distributed with an algorithm for generating an instance key, based on knowledge of its hardware type, the KGI (which in some implementations is supplied at initialization), and a master key only known to the ASIC. As discussed above, the DSP driver initially acquires the hardware type from the ASIC, which is passed to the DRM. The DRM then releases its current version of $KGI_{DRM}$ to the ASIC. The ASIC attempts to match the version of the $KGI_{ASIC}$ to the $KGI_{DRM}$. If the $KGI_{DRM} > KGI_{ASIC}$ then the $KGI_{ASIC}$ is advanced to match $KGI_{DRM}$, and the instance key (IK) is recalculated. In some embodiments, a random (non zero) challenge value is also generated ($RN_{chal}$) and stored in the specified slot. If $KGI_{DRM} = KGI_{ASIC}$ then a random (non zero) challenge value is generated ($RN_{chal}$) and stored in the specified slot.

When $KGI_{DRM} < KGI_{ASIC}$ then the ASIC ignores the initialization message. In some embodiments, when $KGI_{DRM} < KGI_{ASIC}$, a random (non zero) challenge value is generated ($RN_{chal}$) but it is not stored, and alternatively a value of zero is stored in the specified slot instead. The storing of the zero value thus appears to an attacker trying to restore obsolete software that the protocol is functioning properly, however the ASIC is not able to complete and thus decrypt the content from the tampered software. In some embodiments, error is returned when the $KGI_{ASIC}$ internally to the ASIC is greater than the $KGI_{DRM}$ received from the DRM.

In some embodiments, security of the system is further enhanced by provide a KGI counter in the ASIC. This KGI counter is a one way counter (e.g., only increments). A zero value in the counter has a defined significance, in some embodiments, and is generally not used as an actual key generation. When the KGI counter is incremented past a maximum value, it rolls over to zero. Once the counter value is zero, the counter function is disabled, and the value can not be changed again preventing reuse.

The ASIC is utilized to outsource computationally expensive decryption, thus freeing up the CPU for other functions. In achieving this distributed decryption, the ASIC is configured in some embodiments to provide multiple functions. Some of the functions include:

Generation of instance keys (IK) used to decrypt the information and/or content transmitted between the main system 122 and the ASIC, and the calculation of the content of the secure transmissions between the main system 122 and the sub-system 124 and/or ASIC 152, where an instance key is generated based on the master key internal to the ASIC and the key generation indicator (KGI) that is managed securely;

Determination of the KGI to be used as a result of input from the main system;

Simultaneous decryption sessions for multiple tracks of content, where in some embodiments, a video encryption algorithm (VEA) is applied;

Re-encryption of content between the ASIC and the DSP; and

Management of countdown timers.

In implementing these functions, the ASIC further adheres to a number of security parameters to maintain the security of at least the content, content keys, and instance keys, as fully described above and further described below.

The ASIC internally generates and/or regenerates the instance key according to a corresponding KGI value and the hardware type of the DRM version as a function of the master key, maintained within the ASIC, and the KGI value (e.g., IK=$f$(MK, KGI). In some embodiments, it is desirable to use a one-way hash function (e.g., maximum distance separable (MDS) or secure hash algorithm 1 (SHA1)) for the function $f(\ )$ because it is difficult to calculate back, however, substantially any algorithm may be employed as long as the master key is not readily, and preferably can not be determined from the instance key and KGI value, and that subsequent instance keys are not easily determined when one of any instance keys is intercepted and/or improperly obtained (i.e., hacked). In some embodiments following the generation at the ASIC of the instance key, the ASIC optionally stores the generated instance key within the ASIC, and accesses the instance key as needed. As such, the instance key is not regenerated, in these embodiments, unless a change in the KGI value is received. The generation and/or regeneration of an instance key is typically not externally invokable by physical or software means. Further, the values of instance keys are generally not externally readable or modifiable by physical or software means.

Further, the ASIC generates a random number in response to the initialization message, at least in part, to enhance the encryption of the content key. The content key is to be encrypted using a mechanism robust enough to prevent attacks (e.g., replay attacks), because the communication link between the CPU 122 and DSP 154 is potentially externally accessible (e.g., via a PCI bus). In some embodiments, a two-message protocol is specified for encryption (which provides for a simplified design for some implementations). The ASIC implements a random number generator internally, activating a function that generates a new random number (RN) each time it is called. A generated random number is forwarded to the CPU (acting as a nonce in some implementations). The CPU utilizes the random number when encrypting a content key associated with slot. In some embodiments, the CPU generates an adjusted or derivative random number (e.g., increments the random number by one ($RN_{chal}+1$)), and concatenates this adjusted random number with at least the content key prior to encryption. Additional parameters can similarly be concatenated with the content key prior to encryption. The content key and the concatenated parameters are then encrypted and forwarded to the ASIC. For example, an encrypted content key message is generated in some implementations according to:

$$\text{Encrypted Content Key Message} = (0, RN_{chal} + 1 | VD | CK) | IV,$$

where $RN_{chal}$ represents the random number that the ASIC generated, CK is the content key, IV is an initial vector, and VD is a validity date of a content key. Note that A|B indicates a concatenation process, and in some implementations indicates a process to connect to LSB (A) from MSB (B). Upon decryption of this encrypted value, the ASIC extracts the adjusted random number and compares it with the locally stored random number (e.g., by adjusting the locally stored random number). When a match is detected, the ASIC has verified the content key with the slot and the track to be decrypted. In some implementations, the system employs the random number generation for each encrypted track.

In some preferred embodiments, the ASIC supports multiple concurrent decryption processes that provide multiple simultaneous decryptions of multiple sessions or tracks. Each track to be decrypted is associated with a decryption session and in some implementations a video encryption algorithm (VEA) is employed for each session. By providing simultaneous decryption, the present embodiments are capable of cooperating and/or simultaneously rendering the tracks of content (e.g., multimedia content with audio and video tracks). Further, the simultaneous decryption allows for the decryption of the plurality of tracks, where each is encrypted with a different content key.

Typically, a session is associated with a single slot. The session is activated by the ASIC upon receiving the initialization message, and terminates the session when the KGI at the ASIC is greater than the KGI from the DRM, or when a lifetime of a successfully received content key expires and the key is discarded and/or ignored by the ASIC. Depending on the track (and/or the parameters of the track), multiple sessions may be created to process the entire track. For example, in some implementations the lifetime forwarded to the ASIC with the content key in the response message provides only a limited and/or short amount of operating time. This lifetime may be less than the amount of time needed to decrypt and/or play the entire content. The sessions may terminate, and additional sessions are initiated multiple times to render the single stream and/or track. The limited time provides added security in that unauthorized access would require the interception and decryption of each lifetime.

With limited lifetimes for content keys, one or more subsequent sessions are generated with the same content key and new life times for each session (e.g., content key is sent again for another session based on a new random number, establishing a new session). The new session is preferably initiated before the previous session terminates so that there is continuous playback and/or access to the content. In some embodiments, the ASIC continues to use the same slot to initiate a new session for subsequent lifetimes and/or portions of the same track. Further, the DRM is capable in some implementations of regenerating an additional response message with a new lifetime (or extension of a lifetime) prior to the termination of a previous lifetime. This allows the ASIC to receive and incorporate a new lifetime to allow continuous and seamless decryption and playback of the content.

As discussed above, the ASIC in some embodiments re-encrypts the decrypted content for communication between the ASIC and DSP for rendering. By re-encrypting the content, added security is provided in attempts of preventing unauthorized access to the content. Some implementations utilize a light encryption between the ASIC and DSP to reduce to computational processing at the DSP for decrypting the re-encrypted content. In some embodiments, the re-encryption is implemented by applying a function that XORs a random number ($RN_{encry}$) with the decrypted content and/or data. The re-encryption implemented in some implementations is achieved according to:

$$\text{Output} = VEA\ dec(IV, VEA\ enc(IV, \text{Plain}, CK), CK) XOR\ RN_{encry},$$

where CK represents a content key and $RN_{encry}$ represents a random number generated by the ASIC (e.g., a random number of 16 bytes). The encryption random number $RN_{encry}$ is a secret value and is typically obtained by the DSP directory from the ASIC. When the encryption random number is generated and/or transferred to the DSP, some embodiments ensure that the window location of the PCI bus is out of the ASIC memory area. In some implementations, the DSP extracts the key used for re-encryption (e.g., the encryption random number $RN_{encry}$) prior to decrypting the re-encrypted content and/or data. Following the extraction by the DSP of the re-encryption key (e.g., the encryption random number) the ASIC generates a new random number for a subsequent re-encryption.

The ASIC further utilizes one or more timers and/or counters to, at least in part, limit the use of content keys according to the governances of the license. In some preferred implementations, a lifetime or remaining play time of a content key is defined and forwarded to the ASIC when the content key is communicated to the ASIC (for example in the response message ($MSG_{resp}$) generated in response to the challenge message as fully described above). As a result of processing a response message, the ASIC extracts the lifetime of a content key and the lifetime value is set in the specified slot. The storage is tied to a clock and the value, in some implementations, continuously decreases until it reaches zero. When the value of the lifetime reaches zero, the content key in the associated slot expires (and in some implementations, is set to zero). In preferred embodiments, the countdown and/or expiration functionality is not externally invokable or modifiable by physical or software means.

In some embodiments, a content key lifetime is limited to a maximum duration. For example, some implementations set a maximum duration of a lifetime to be 24 hours. A validity date can also be employed. This validity date is not necessarily stored in the volatile memory and may be cleared to zero by deleting the content key automatically when switched off. The ASIC records the time set for each slot since the validity date is typically relative to the time that the content key is delivered. The ASIC further deletes the content key when the validity period expires. In some embodiments, the secure system and/or tamper resistant software is able to set the validity time period indefinitely, and in some implementations set values in seconds (e.g., expressed by a 32 bits value with the value of 0x00000000 indicates unlimited validity). The validity value, in some embodiments, is forwarded with the content key and encrypted using the instance key.

The ASIC in some embodiments, further utilizes one or more timers to identify an expiration of a challenge random number ($RN_{chal}$) generated in response to the initialization message ($MSG_{init}$). As a result of processing the initialization message, the challenge random number value is generated for inclusion in the response message, and stored in the specified slot. When the value is stored in the slot, an internal timer is started. Following a predefined period, the challenge random number is set to zero. For example, in some embodiments, the challenge random number is valid for one second, and then is reset to zero. This reset function of the challenge random number preferably cannot be externally invokable or modifiable by physical or software means. The expiration of the challenge random number limits the time an attacker has to try and attach the system (e.g., employing dictionary attacks). The expiration of the challenge random number also aids in verifying that the lifetime of the content key in the response message is sufficiently relevant to when it was sent.

The present embodiments employ many factors to expand the secure environment of the main board 122 to the sub-system 124. Some these security factors are directed at communications between the main system and the sub-system, memory storage, access to the sub-system and components of the sub-system, and other such factors. In some embodiments, security is provided by coupling the DSP with the ASIC over a secure bus. Additional security is employed by limiting access to memory of and/or utilized by the DSP and/or ASIC. Some implementations utilize a multipurpose memory. This multipurpose memory may be susceptible to possible external data probes flowing through the bus. Furthermore, if the memory area is visible from the PCI bus with which the DSP is connected, compressed raw content data may become accessible, for example, by using a PCI bus analyzer. In some preferred embodiments, however, the memory space of the DSP is greater than a window size that the PCI bus can access (e.g., the memory space of the DSP may be 32G bytes whereas the window size that the PCI bus can access is 4M bytes). Thus, some preferred embodiments set the internal register of the DSP out of the PCI memory area, preventing access to the DSP memory area from the PCI bus.

The present embodiments further enhance security through persistent storage for the master key. The master key is, in some embodiments, burned into the ASIC at manufacturing time. This value is not externally readable or modifiable by physical or software means after it is set. Therefore, the master key is known to the ASIC and preferably cannot be compromised. Some embodiments further provide for persistent storage of the ASIC KGI value. The ASIC KGI value is maintained in a secure counter. The counter only advances. This KGI value is not externally modifiable by physical or software means. It is generally only modified internally by the ASIC itself as a result of processing an initialization message ($MSG_{init}$). Similarly, the DRM KGI value is maintained in a secure location, and in some preferred implementations is burned into the DRM software at manufacture and/or distribution. In the event that the DRM KGI is compromised and/or believed to be compromised, some embodiments require a new version of the DRM software, with a new KGI, replace the compromised DRM.

In some embodiments, the DRM KGI value is defined with a sufficient size (e.g. 32, 64 or other number of bits). Utilizing a sufficiently large size allows the DRM KGI value to be intentionally rolled and/or changed (e.g., by updating the DRM software) on a frequent and/or periodic basis. The change of the DRM KGI, as described above, causes a corresponding change to the ASIC KGI. The large size of the value avoids concerns of exhausting the KGI values and/or key space. The intentional changing of the DRM KGI is employed, in some embodiment, instead of attempting to detect when an instance key is potentially compromised. In some embodiment, however, the intentional changing of the DRM KGI is utilized in addition to attempts of determining whether an instance key is compromised. Practical deployment concerns are the limiting function regarding how frequently updates of the DRM KGI are scheduled, and not the size of the KGI.

The present embodiments employ additional security through the use of session slot storage. The ASIC supports multiple concurrent tracks (e.g., 2, 3, 4, or more concurrent track). The state data for a track is stored in a defined slot. Typically, the state data consists of a content key, a challenge random number ($RN_{chal}$) value, and a lifetime or play time remaining value. These values are not externally readable or modifiable by physical or software means. They are modified internally by the ASIC itself as a result of processing the initialization message and/or response message, or execution of the challenge random decay or content key lifetime countdown functions.

Further security is employed during the processing of the initialization message ($MSG_{init}$) and/or response message ($MSG_{resp}$) received at the ASIC. In some embodiments, processing of initialization message occurs within the ASIC without reference to hardware (including memory) outside the ASIC. The processing of initialization message includes the generation of the challenge message as fully described above. Similarly, in some embodiments processing of response message occurs within the ASIC without reference to hardware (including memory) outside the ASIC. The processing of the response message is fully described above.

In some embodiments, the cooperation between the main system 122 and the sub-system 124 establishes a sub-DRM on the sub-system 124 that has limited capabilities. The DRM in the main system 122 is a highly functional DRM with rich processing functionality that supports rich rights expressions. The security of the DRM environment is extended over a communication link to establish, in effect, a sub-DRM of the sub-system. In some implementations, the sub-DRM establishes a session, and decrypts and renders received content using a received content key for a predefined period of time, establishing a simplified DRM with minimal expressiveness.

While the invention herein disclosed has been described by means of specific embodiments and applications thereof, numerous modifications and variations could be made thereto by those skilled in the art without departing from the scope of the invention set forth in the claims.

What is claims is:

1. A method for use in decrypting content, comprising:
receiving a first content key at a first system for the decryption of a first track of encrypted content;
encrypting the first content key according to a first instance key stored at the first system producing a first encrypted content key;
communicating the first encrypted content key over an externally accessible communication link to a second system;
generating the first instance key at the second system from both a master key and a first key generation indicator value, such that the first instance key is not communicated to the second system;
where the master key is recorded at the second system prior to the second system being coupled with the externally accessible communication link and prior to the second system receiving the first encrypted content key;
where the first key generation indicator value is stored at the second system prior to receiving the first encrypted content key;
wherein the generating the first instance key at the second system comprises:
the second system accessing the master key and the first key generation indicator value;
the second system receiving, from the first system, a verification value;
the second system verifying that the first key generation indicator value corresponds with the verification value;
generating, when the first key generation indicator value is verified, the first instance key at the second system as the function of both the first key generation indicator value and the master key;
altering, at the second system without further communication from the first system, the key generation indicator value when the key generation indicator value is not verified;
verifying, at the second system, the altered key generation indicator value corresponds the verification value; and
generating, when the altered key generation indicator value is verified and when the first key generation indicator value is not verified, the first instance key at the second system as a function of both the altered key generation indicator value and the master key stored at the second system;
decrypting the first encrypted content key using the generated first instance key at the second system providing a first unencrypted content key; and
decrypting the first track of encrypted content using the first unencrypted content key at the second system.

2. The method of claim 1, further comprising:
receiving a second content key at the first system for the decryption of a second track of encrypted content;
encrypting the second content key according to the first instance key stored at the first system producing a second encrypted content key;
communicating the second encrypted content key over the communication link to the second system;
decrypting the second encrypted content key using the generated first instance key at the second system providing a second unencrypted content key; and
simultaneously decrypting, at the second system, the second track of encrypted content using the second unencrypted content key at the second system while decrypting the first track of encrypted content using the first unencrypted content key at the second system.

3. The method of claim 1, further comprising:
renewing the first system including receiving a second instance key; encrypting a third content key at the first system according to the second instance key producing a third encrypted content key;
communicating the third encrypted content key over the communication link to the second system;
notifying the second system of the renewing of the first system;
identifying, at the second system, a second key generation indicator value;
generating, in response to the notifying the second system, the second instance key at the second system as a function of both the master key and the second key generation indicator value;
decrypting the third encrypted content key using the generated second instance key at the second system providing a third unencrypted content key; and
decrypting of a third track of encrypted content using the third unencrypted content key at the second system.

4. The method of claim 3, further comprising:
preventing the use of the first instance key at the second system following the generation of the second instance key at the second system.

5. The method of claim 3, wherein the notifying the second system of the renewing of the first system comprises communicating a new verification value to the second system where the new verification value is different than a the verification value; and
the generating the second instance key at the second system comprises:
verifying that the second key generation indicator value corresponds with the new verification value; and
generating the second instance key, when the second key generation indicator value corresponds with the new verification value, as a function of both the master key and the second key generation indicator value.

6. The method of claim 1, further comprising:
determining that a first time period has expired; and
preventing the decryption at the second system with the first unencrypted content key of a remaining portion of the first track that is still encrypted when the first time period has expired.

7. The method of claim 6, wherein the communicating the first encrypted content key further comprises communicating a first lifetime of the first content key such that the determining that the first time period has expired comprises determining the first lifetime of the first content key has expired; and
communicating a second lifetime of the first content key to the second system such that the second system again allows decryption at the second system with the first unencrypted content key of at least some of the remaining portion of the first track that was encrypted when the first time period expired.

8. A method for use in decrypting content, comprising:
receiving, at a first device coupled with a communication link, a first encrypted content key, wherein the first encrypted content key is encrypted by an external system using a first instance key; where the first encrypted content key is received over the communication link; the external system is external to the first device; and where communications over the communication link are accessible by one or more additional devices;

generating the first instance key within the first device such that the first instance key is not communicated to the first device, wherein the generating the first instance key comprises:
- accessing a master key stored within the first device, where the master key is stored within the first device prior to the first device being coupled with the communication link and prior to the first device receiving the first encrypted content key;
- accessing a key generation indicator value stored within the first device, where the key generation indicator value is stored within the first device prior to the first device receiving the first encrypted content key;
- receiving, from the external system, a verification value;
- verifying the key generation indicator value corresponds with the verification value; and
- generating, when the key generation indicator value is verified, the first instance key as a function of both the master key and the key generation indicator value;
- adjusting, at the first device and without further communication from the external system, the key generation indicator value when the key generation indicator value is not verified providing an adjusted key generation indicator value;
- verifying, at the first device, that the adjusted key generation indicator value corresponds with the verification value; and
- generating, when the adjusted key generation indicator value is verified, the first instance key at the first device as a function of both the adjusted key generation indicator value and the master key stored at the first device;
- decrypting, at the first device, the first encrypted content key using the generated first generated instance key;
- extracting, at the first device, a first content key through the decryption of the first encrypted content key; and
- decrypting, at the first device, a first track of encrypted content with the first content key.

9. The method of claim 8, further comprising:
preventing further decryption, at the first device, with the first instance key generated from the key generation indictor value and the master key when the key generation indicator value is not verified.

10. A system comprising:
a main system coupled with a network to receive a first content key;
a sub-system;
a communication link coupled between the main system and sub-systems;
the main system comprising a first instance key and an encryption circuit such that the encryption circuit encrypts the first content key with the first instance key to produce a first encrypted content key, and the main system communicates the first encrypted content key and further communicates a validation value to the sub-system over the communication link; and
the sub-system comprises a first slot, a decryption circuit coupled with the first slot, an instance key generator coupled with the decryption circuit, a master key, and a counter that provides a first key generation indicator value,
wherein the master key is stored at the sub-system prior to the main system receiving the first encryption content key;
wherein the sub-system stores the first encrypted content key in the first slot;
wherein the instance key generator generates, upon validating the first key generation indicator value relative to the validation value, a first generated instance key as a function of both the master key and the first key generation indicator value;
wherein the counter provides an adjusted first key generation indicator value when the first key generator indicator value is not validated, and the instance key generator generates an adjusted first generated instance key as a function of both the master key and the adjusted first key generation indicator value upon validating the adjusted first key generation indicator value relative to the validation value;
wherein the first generated instance key is identical to the first instance key of the main system; and
wherein the decryption circuit decrypts the first encrypted content key with the first generated instance key retrieving the first content key and decrypts at least a portion of a first track of encrypted content using the first content key.

11. The system of claim 10, wherein the communication link is a user accessible bus.

12. The system of claim 10, wherein the sub-system further comprises a digital signal processor coupled with the decryption circuit, wherein the digital signal processor receives the decrypted first content from the decryption circuit and renders the first content from the sub-system.

13. The system of claim 10, wherein the sub-system further comprises a second slot such that the sub-system stores a second encrypted content key in the second slot, the instance key generator generates a second generated instance key as a function of the master key and a second key generation indicator value, and the decryption circuit decrypts the second encrypted content key with the second generated instance key retrieving the unencrypted second content key and decrypts at least a portion of a second track of encrypted content using the unencrypted second content key.

14. The system of claim 10, wherein the main system further receives a second instance key replacing the first instance key, and further receives a second content key, such that the encryption circuit encrypts the second content key with the second instance key to produce a second encrypted content key, and the main system communicates the second encrypted content key and a new verification value to the sub-system over the communication link; and
the instance key generator generates a second generated instance key as a function of the master key and a further adjusted first key generation indicator value, when the further adjusted key generation indicator value is verified relative to the new verification value, such that the second generated instance key is identical to the second instance key of the main system, and the decryption circuit decrypts the second encrypted content key with the second generated instance key retrieving the unencrypted second content key and decrypts second encrypted content using the unencrypted second content key.

15. The system of claim 14, wherein the decryption circuit prevents further decryption using the first generated instance key following the generation of the second generated instance key, and prevents the further use of the first key generation indicator value in the generation of instance keys.

16. The method of claim 1, further comprising:
generating, at the second system, a challenge message prior to receiving the first encrypted content key;
storing, at the second system, at least a portion of the challenge message;

forwarding, from the second system to the first system, the challenge message;

receiving, at the second system from the first system, a response to the challenge message comprising the first encrypted content key and a challenge verification parameter;

extracting, at the second system, the challenge verification parameter from the communication received from the first system;

altering, at the second system, the at least the portion of the stored challenge message;

determining, at the second system, whether the altered portion of the challenge message corresponds to the challenge verification parameter; and implementing the decrypting of the first encrypted content key when the altered portion of the challenge message corresponds to the challenge verification parameter.

17. The method of claim 16, wherein the generating the challenge message comprises generating a non-zero challenge value;

wherein the storing the at least the portion of the challenge message comprises:

storing, when the first key generation indicator value is verified, the challenge value associated with a slot; and storing a zero value, and not the challenge value, in response to determining that the first key generation indicator value is not verified; and ignoring, at the second system when the zero value does not correspond to the challenge verification parameter, the received first encrypted content key and not allowing the decrypting of the first encrypted content key.

* * * * *

UNITED STATES PATENT AND TRADEMARK OFFICE
CERTIFICATE OF CORRECTION

PATENT NO. : 8,103,004 B2  
APPLICATION NO. : 10/921498  
DATED : January 24, 2012  
INVENTOR(S) : Chavanne et al.

It is certified that error appears in the above-identified patent and that said Letters Patent is hereby corrected as shown below:

In the CLAIMS:

Claim 5, column 22, line 31, delete "than a" and insert --than--.

Signed and Sealed this
Tenth Day of July, 2012

David J. Kappos
*Director of the United States Patent and Trademark Office*